(12) United States Patent
Zhou et al.

(10) Patent No.: US 8,371,155 B2
(45) Date of Patent: Feb. 12, 2013

(54) SCANNING PROBE MICROSCOPY EMPLOYING CORRELATION PATTERN RECOGNITION

(75) Inventors: Lin Zhou, Eagan, MN (US); Huiwen Liu, Eden Prairie, MN (US); Dale Egbert, Deephaven, MN (US); Peter Gunderson, Ellsworth, WI (US); John Ibele, Minneapolis, MN (US); Kah Choong Loo, Bayan Lepas (MY); Cing Siong Ling, Bayan Lepas (MY)

(73) Assignee: Seagate Technology LLC, Cupertino, CA (US)

( * ) Notice: Subject to any disclaimer, the term of this patent is extended or adjusted under 35 U.S.C. 154(b) by 252 days.

(21) Appl. No.: 12/854,112

(22) Filed: Aug. 10, 2010
(Under 37 CFR 1.47)

(65) Prior Publication Data

US 2011/0138505 A1   Jun. 9, 2011

Related U.S. Application Data

(63) Continuation-in-part of application No. 12/179,688, filed on Jul. 25, 2008.

(51) Int. Cl.
*G01N 19/02* (2006.01)
(52) U.S. Cl. .......................................................... 73/104
(58) Field of Classification Search .................. None
See application file for complete search history.

(56) References Cited

U.S. PATENT DOCUMENTS

| | | | |
|---|---|---|---|
| 8,072,613 B2 * | 12/2011 | Schmitz et al. ............... 356/608 |
| 2008/0270043 A1 * | 10/2008 | Jesmonth ......................... 702/34 |
| 2011/0131690 A1 * | 6/2011 | Novak et al. .................... 850/43 |
| 2011/0248990 A1 * | 10/2011 | Beauchamp et al. .......... 345/419 |

\* cited by examiner

*Primary Examiner* — Robert R Raevis
(74) *Attorney, Agent, or Firm* — Mitchell K. McCarthy; McCarthy Law Group

(57) ABSTRACT

An apparatus and associated method for topographically characterizing a workpiece. A scanning probe obtains topographical data from the workpiece. A processor controls the scanning probe to scan a reference surface of the workpiece to derive a first digital file and to scan a surface of interest that includes at least a portion of the reference surface to derive a second digital file. Correlation pattern recognition logic integrates the first and second digital files together to align the reference surface with the surface of interest.

20 Claims, 13 Drawing Sheets

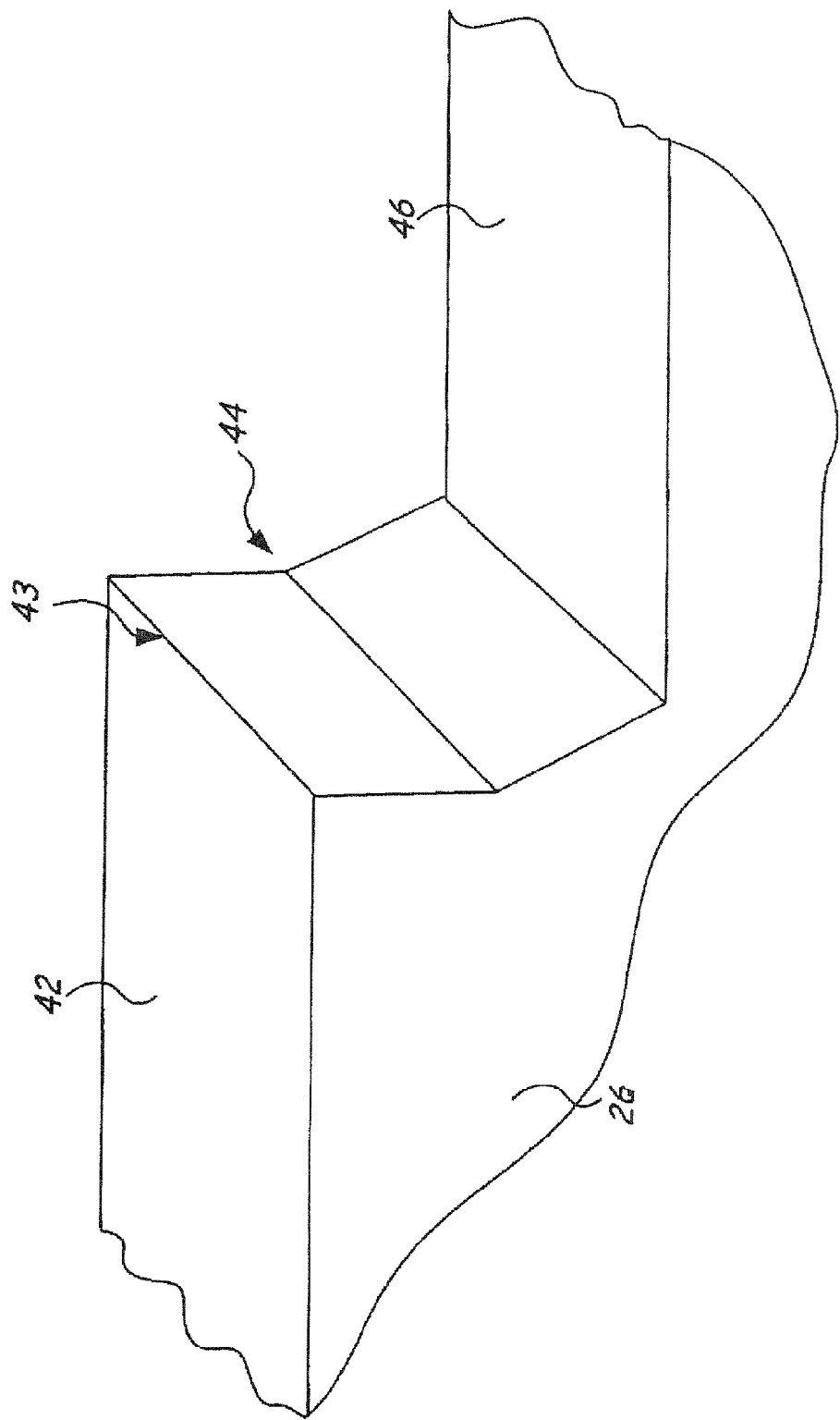

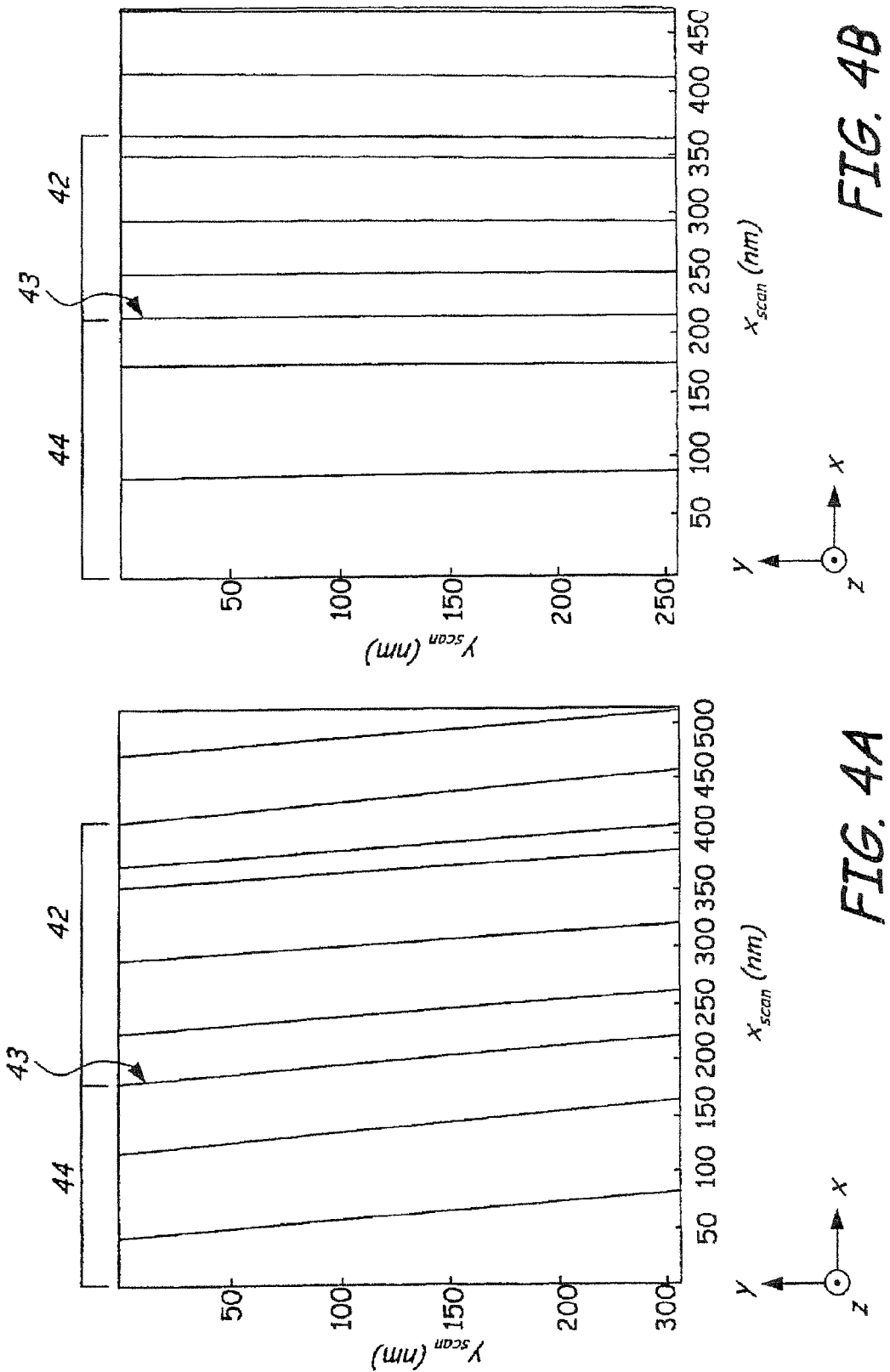

SCANNING PROBE MICROSCOPY EMPLOYING CORRELATION PATTERN RECOGNITION

RELATED APPLICATIONS

This application is a continuation in part of co-pending application Ser. No. 12/179,688 filed Jul. 25, 2008.

BACKGROUND

The present invention relates to scanning probe microscopy, and more particularly to using atomic force microscopy to produce an image profile representative of a structure.

Atomic force microscopy (AFM) is a metrology technique that is useful for measuring and imaging surface features of structures having dimensions in the nanometer and micrometer range. AFM may be used to scan structures made of any material in a short period of time to produce high resolution two-dimensional and three-dimensional images of the structure. AFM is an important tool for measuring dimensions of devices in the semiconductor industry, including magnetic recording devices and microelectromechanical system (MEMS) devices.

The lateral resolution of an image produced from an AFM scan of a structure is defined by the scan area size and the number of pixels in the image. Thus, in order to increase the lateral resolution of an image, the size of the scan area may be reduced or the amount of data in the image (i.e., the number of pixels) may be increased. However, a reduction in the size of the scan area removes contextual details around the scanned area of interest, which makes determining the relative sizes and positions of features within the structure difficult. On the other hand, to increase in the amount of data in the scan, the scan speed may be reduced, which decreases measurement throughput and may result in drift errors in the image. The increased amount of data in the scan also wastes the limited available data on areas outside of the areas of interest in the scan.

In addition, the small dimensions of the scanned structure result in missed details or the introduction of artifacts into the resulting image. For example, when scanning a structure including features having significant topographical transitions, feedback overshoot may occur at the transition locations, resulting in lost details in the representative image at the transition locations. In addition, a scan of a flat or planar feature in the structure may result in a curving or bowing artifact in the resulting image at the location of the flat or planar feature. This may be caused by the relative sizes and shapes of the scanning probe tip and the scanned feature. Image curvature may also occur when the scanning probe tip moves faster in one direction than the other along the structure surface because environmental vibrations, thermal drifting, and air flow along the probe tip may affect the image in the slower scan direction.

SUMMARY

In some embodiments a method is provided of topographically characterizing a workpiece. The method includes scanning a reference surface of the workpiece with a scanning probe to derive a first digital file characterizing topography of the reference surface; scanning a surface of interest of the workpiece, the surface of interest at least in part defined by a subportion of the reference surface, with the scanning probe to derive a second digital file characterizing topography of the surface of interest; and executing computer instructions stored in memory that integrate the first and second digital files together in relation to correlation pattern recognition logic to align the reference surface with the surface of interest.

In some embodiments an apparatus is provided for topographically characterizing a workpiece. The apparatus includes a scanning probe that obtains topographical data from the workpiece. A processor controls the scanning probe to scan a reference surface of the workpiece to derive a first digital file and to scan a surface of interest that includes at least a portion of the reference surface to derive a second digital file. Correlation pattern recognition logic integrates the first and second digital files together to align the reference surface with the surface of interest.

In some embodiments a topography metrology apparatus is provided, having a processor controlling a scanning probe to obtain topographical data from a workpiece, and having means for integrating two or more sets of the topographical data together in relation to a statistical determination that one of the sets of topographical data define a pattern matching a pattern defined by another one of the sets of topographical data.

BRIEF DESCRIPTION OF THE DRAWINGS

FIG. 2 is a perspective view of a cavity transition feature for measuring with atomic force microscopy (AFM) techniques.

FIG. 4A is a two-dimensional plot of a raw scanned image profile of a cavity transition feature.

FIG. 4B is a two-dimensional plot of a tilted image profile of the cavity transition feature.

DETAILED DESCRIPTION

Figure 1:
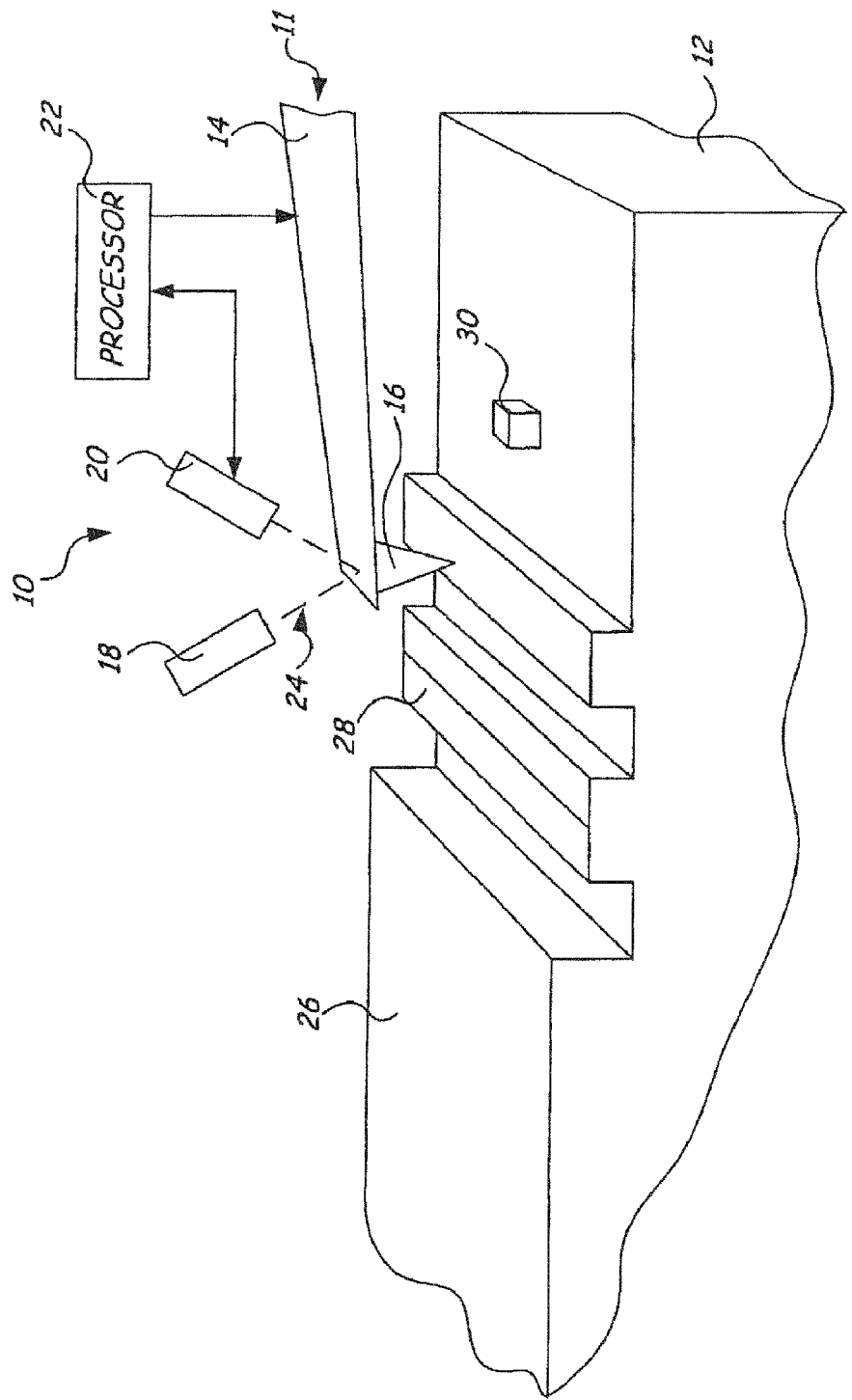
FIG. 1 is a perspective view of an atomic force microscope probe positioned over a surface of a structure.

FIG. 1 is a perspective view an atomic force microscope 10 positioned over a surface of structure 12 (sometimes referred to herein as "workpiece"). Atomic force microscope 10 includes probe 11 having cantilever portion 14 and tip portion 16. Atomic force microscope 10 also includes light source 18, position sensitive detector 20, and processor 22. Light source 18 emits a beam 24 that is reflected by cantilever 14 and received by position sensitive detector 20. Processor 22 receives signals from position sensitive detector 20 and provides signals to control movement of probe 11 relative to structure 12.

Structure 12 is the pole tip region of a magnetic recording system, including slider 26 carrying reader structure 28 and writer structure 30. The atomic force microscopy (AFM) techniques described herein are useful for measuring and imaging feature characteristics of structure 12, such as pole tip recession (PTR) features of reader structure 28 and writer structure 30. It should be noted that structure 12 is shown merely for purposes of illustration, and the AFM techniques described herein are also useful for measuring and imaging nanometer and micrometer scale surface features of other structures. For example, the AFM techniques may also be used to measure feature characteristics in other magnetic recording device structures, such as a cavity transition feature as shown in FIG. 2.

Atomic force microscope 10 measures physical characteristics or properties of structure 12, such as feature dimensions and surface finish. Probe tip 16 is positioned in very close proximity (i.e., within picometers) to the surface of structure 12 to allow measurements of structure 12 over a small area. Probe tip 16 is moved relative to structure 12 using extremely precise positioning. For example, processor 22 may control motion of probe 11 such that probe tip moves along the surface of stationary structure 12. Alternatively, processor 22 may control a device such as a tube scanner to move structure 12 while probe 11 remains stationary. As probe tip 16 moves over the surface of structure 12, features on the surface of structure 12 cause cantilever 14 to bend in response to the force between probe tip 16 and structure 12.

A position detector measures the amount of deflection in cantilever 14, which may be used to generate an image representation of structure 12. In particular, light source 18 (e.g., a laser) reflects light beam 24 off of cantilever 14 to position sensitive detector 20. Position sensitive detector 20 may include two side-by-side photodiodes such that the difference between the signals generated by the photodiodes indicates the position of light beam 24 on position sensitive detector 20, and thus the angular deflection of cantilever 14. Because the distance between cantilever 14 and position sensitive detector 20 is generally thousands of times the length of cantilever 14, the motions of probe tip 16 are greatly magnified.

FIG. 2 is a perspective view of slider 26 including air bearing surface (ABS) 42, transition edge 43, cavity transition 44, and cavity 46. Cavity transition 44, which may be defined using ion milling techniques, has very small features varying from nanometer to micrometer scale sizes. Measurement of the features of cavity transition 44 is important in various aspects in the development of the device, including design improvement, device model validation, and device performance enhancement. For example, in a magnetic recording device, the measurement of cavity transition 44 is important for understanding flying performance of slider 26. The AFM techniques described herein may be used to measure the properties of cavity transition feature 44.

Variable Scan Data Density

The lateral resolution of an image produced from a scan of a structure is defined by the scan area size and the number of pixels in the image. Conventionally, atomic force microscope 10 moves relative to the structure at a constant speed, and the position of probe 11 is periodically sampled by processor 22. The resulting image has a uniform resolution across the entire scanned region.

Some structures may include a region or area of interest having a target feature or characteristic of which a more detailed scan may be desired. For example, a detailed scan of pole tip 30 or cavity transition 44 of slider 40 shown in FIG. 2 may be desirable for precise measurement of the dimensions and other characteristics of the transition profile. In order to increase the resolution in the area of interest, the number of pixels or data points in the area of interest may be increased. Because the number of pixels available for a given scan is often fixed, the resolution in the area of interest is thus increased at the expense of limited views of the areas surrounding the area of interest. However, it is also important to maintain the contextual details around the area of interest such that the relative sizes and positions of features within the area of interest are more easily determinable.

Figure 3A:
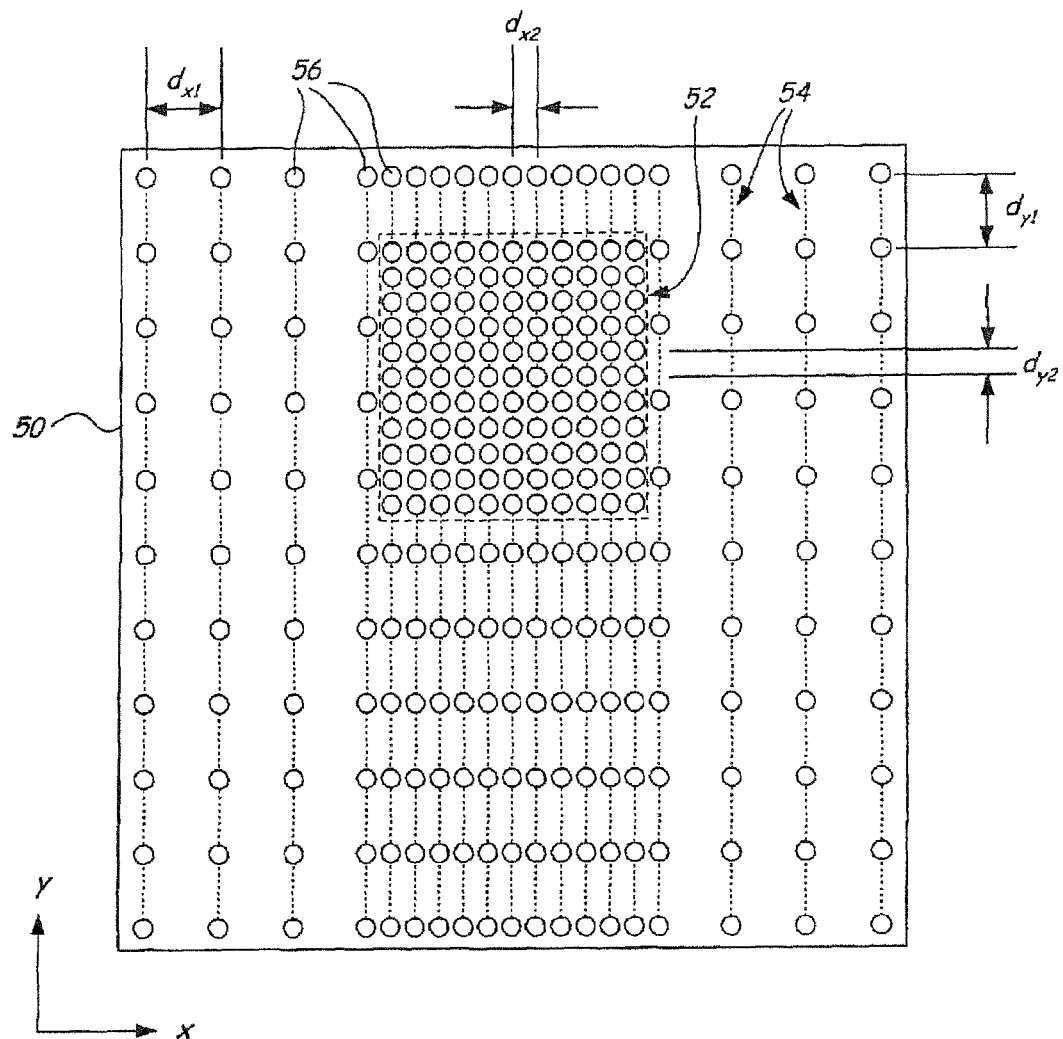
FIG. 3A is a schematic view of a scanning method for increasing the amount of data at an area of interest on a structure.

FIG. 3A is a schematic view of an approach for increasing the amount of data at an area of interest on a scanned structure while maintaining the contextual details of the surrounding areas. In FIG. 3A, the scan area 50 of a structure is shown including area of interest 52. Probe 11 moves around scan area 50 in scan pattern 54 during image acquisition in response to control signals from processor 22. In particular, scan pattern 54 is programmed in processor 22, and processor 22 controls movement of probe 11 relative to the structure in the programmed scan pattern 54. As probe 11 is moved relative along scan pattern 54 within scan area 50, data points or pixels 56 are sampled by processor 22. That is, processor 22 periodically communicates with position sensitive detector 20 to receive information about the position of probe tip 16 relative to position sensitive detector 20. This information is used by processor 22 to set locations of data points 56, which correspond to the pixels in the image generated from data points 56 by processor 22. The resulting image is representative of the structure includes graphical representations of the surface features and characteristics of the structure.

Processor 22 samples data points 56 in the portions of scan area 50 outside of area of interest 52 as probe 11 moves along the y-direction relative to the structure. The data points 56 are separated by a distance $d_{y1}$ in the y-direction and a distance $d_{x1}$ in the x-direction in areas outside of area of interest 52. In one embodiment, distance $d_{x1}$ and distance $d_{y1}$ are equal to provide a continuous lateral resolution in the portions of scan area 50 outside area of interest 52.

In order to increase the resolution at area of interest 52, scan pattern 54 is programmed such that more data points 56 are sampled in area of interest 52 during the scan than in the portions surrounding area of interest 52. The programmed location of area of interest 52 in scan pattern 54 may be determined during the scan based on known position information on the scanned structure, or based on surrounding feature characteristics sensed by probe tip 16. When probe tip 16 is close to area of interest 52, processor 22 reduces the distance between adjacent scan lines in the x-direction to distance $d_{x2}$ to increase the density of data points 56 in the x-direction (i.e., probe tip 16 moves a smaller distance relative to the structure between adjacent scan lines). When probe tip 16 is in area of interest 52, processor 22 increases the number of data points 56 sampled along each scan line (i.e., decreases the spacing between each data point 56 to $d_{y2}$), which increases the data density in area of interest 52 in the y-direction. The resolution in the y-direction may be increased by, for example, increasing the rate at which processor 22 samples the position information of cantilever 14 from position sensitive decoder 20, by adjusting the rate at which probe 11 is moved relative to the structure, or a combination of increasing the sample rate and decreasing the relative motion between probe 11 and the structure. In the embodiment shown, the resolution of the scan in area of interest 52 is three times that in the portions of scan area 50 surrounding area of interest 52.

Atomic force microscope 10 allows the density of data points 56 to be adjusted during the scanning process. From a single scan, the resulting image of the structure has a higher resolution in area of interest 52 than in the remainder of scan area 50. This scan process not only preserves the contextual details in the areas around area of interest 52, but also allows for greater throughput of scans and measurements of the structure since multiple scans are not required.

It should be noted that scan pattern 54 is merely illustrative, and other scan patterns may be used for imaging a structure having different characteristics. For example, if a structure includes multiple areas of interest, the scan pattern may be programmed to increase the sampling rate or reduce the scan speed at the multiple areas of interest to increase the resolution in those areas. In addition, scan pattern 54 may include multiple levels of resolution within the same scan area 50.

Figure 3B:
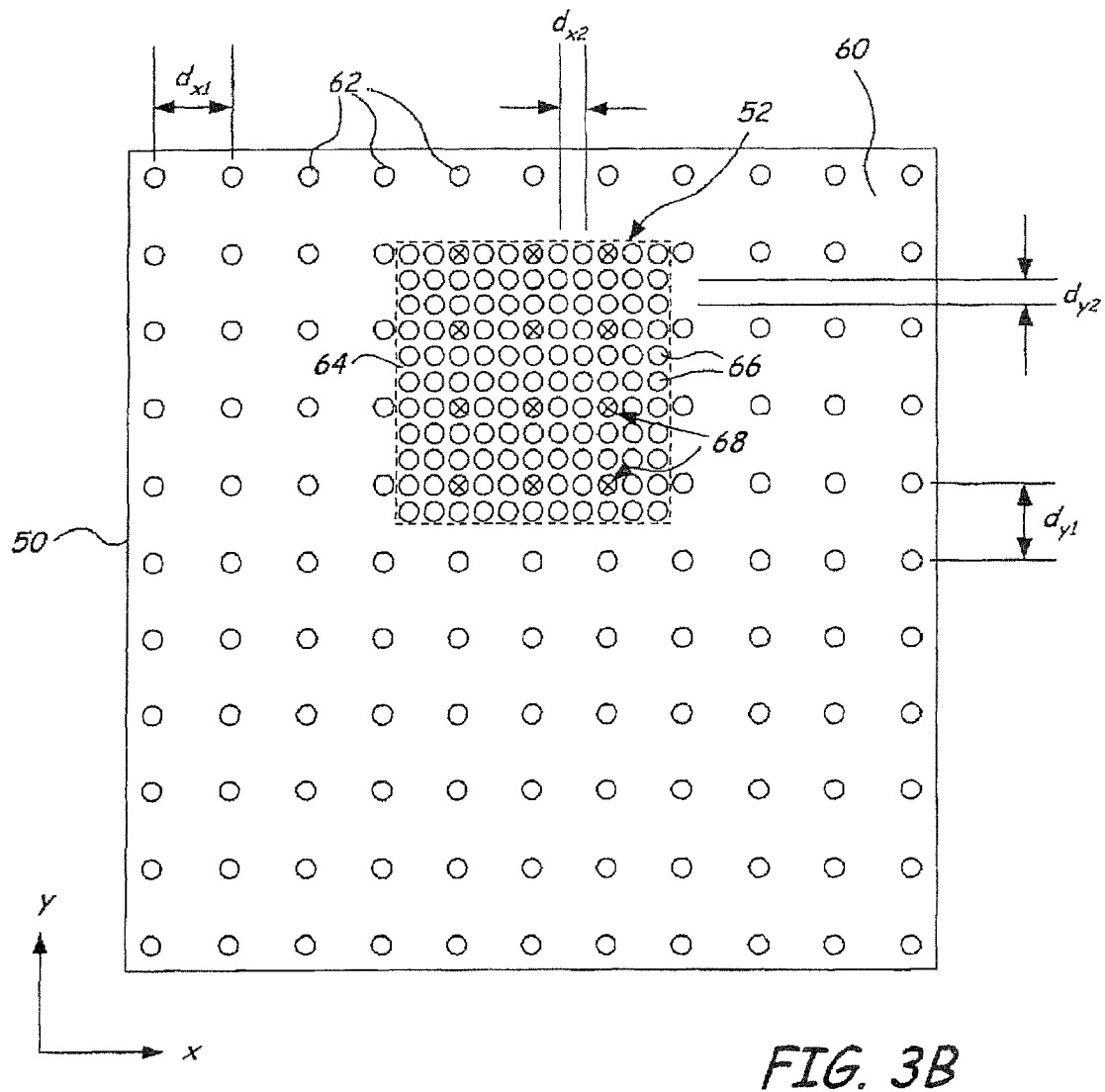
FIG. 3B is a schematic view of another scanning method for increasing the amount of data at an area of interest on a structure.

FIG. 3B is a schematic view of an alternative approach for increasing the amount of data at area of interest 52 while maintaining the contextual details of the surrounding areas in scan area 50. In this embodiment, multiple scans having different resolutions are combined to produce an image profile having a higher resolution at the area of interest than in the surrounding areas of the scan area.

A first scan is performed in a scan pattern 60 across the scan area 50 at a first data density. In particular, processor 22 samples data points 62 in scan area 50 as probe 11 moves in the x-direction and y-direction relative to the structure. The data points 62 are separated by a distance $d_{x1}$ in the x-direction and a distance $d_{y1}$ in the y-direction. In some embodiments, data points 62 are evenly distributed throughout scan area 50. The resulting scan pattern 60 thus provides a relatively low resolution sampling of scan area 50.

A second scan is performed in a scan pattern 64 at a second data density higher than the first data density in area of interest 52. In particular, processor 22 samples data points 66 in area of interest 52 as probe 11 moves in the x-direction and y-direction relative to the structure. The data points 66 of the second scan are separated by a distance $d_{x2}$ in the x-direction and a distance $d_{y2}$ in the y-direction. In order to increase the data density within area of interest 52, distances $d_{x2}$ and $d_{y2}$ are smaller than the corresponding distances $d_{x1}$ and $d_{y1}$ of the first scan. In the embodiment shown, the data density of the second scan is three times greater than the data density of the first scan.

The two scans are then integrated by aligning common data points 68 that are shared between scan pattern 60 and scan pattern 62. For example, during the scanning process, processor 22 may record the location of each data point sampled. The scans would then be integrated together by matching locations of data points 62 in scan pattern 60 with data points 66 in scan pattern 64. Processor 22 may also record topographical characteristics of each data point sampled, which would allow the scan patterns to be integrated by matching the topographical pattern of scan pattern 60 with that of scan pattern 62. Those embodiments are described in more detail below. In any case, when the scans have been integrated, the resulting image of scan area 50 has a higher resolution in area of interest 52 than in the remainder of scan area 50.

It should be noted that scan patterns 60 and 64 are merely illustrative, and other scan patterns may be used for imaging a structure having different characteristics. For example, if a structure includes multiple areas of interest, additional scans may be performed to produce a scan pattern for each area of interest for ultimate integration into the contextual scan pattern. In addition, scan pattern 54 may include multiple levels of resolution within the same area of interest 52. That is, multiple scans may be taken of area of interest 52 with varying data densities such that the most relevant or interesting portions of area of interest 52 have the highest data density, and the data density decreases with increasing distance from area of interest 52.

Transition Profile Skew Correction

When a structure (such as slider 26) is scanned by atomic force microscope 10, it is held in position on a linear stage or other positioning device, such as in a tray, by a fixture, or with adhesive. However, due to positioning errors, the structure may not be precisely aligned with atomic force microscope 10 with respect to the contours of the programmed scan pattern. For example, the structure may be skewed in one direction relative to the scan pattern, or the structure may be tilted relative to the plane of the scan pattern. The image resulting from the misaligned scan thus may not represent the true profile of the structure, making an accurate measurement of the dimensions of the scanned structure and features of the structure difficult. In addition, even if the positioning of the structure relative to atomic force microscope 10 is perfect, variations in the components of atomic force microscope 10 (e.g., due to environmental conditions) may result in a misaligned image.

For example, in a scan of slider 26 (FIG. 2), the dimensions and characteristics of cavity transition 44 may be measured. Measurement of cavity transition 44 is important for understanding flying performance of slider 26, as well as for device design improvement, model validation, and performance enhancement. Cavity transition 44 may be measured relative to another feature on slider 26, such as ABS 42, to allow for analysis of the shape of cavity edge 43 and cavity transition 44. However, if the image of ABS 42 is skewed or tilted due to mispositioning of slider 26 or due to performance of atomic microscope 10, characteristics of cavity transition 44 may be difficult to measure.

FIGS. 4A-4D show an approach to correcting the skew and tilt in an image based on a scan of slider 26 including cavity transition feature 44. To minimize alignment artifacts caused by variations in the components of atomic force microscope 10 and environmental conditions, the scan was performed at a 0.2 Hz sampling rate with probe tip 16 having a radius of less than about 30 nm proximate to slider 26. Each step described herein with regard to correcting the skew and tilt in the image may be performed by processor 22 or by a microprocessor based system external to atomic force microscope 10.

Figure 4C:
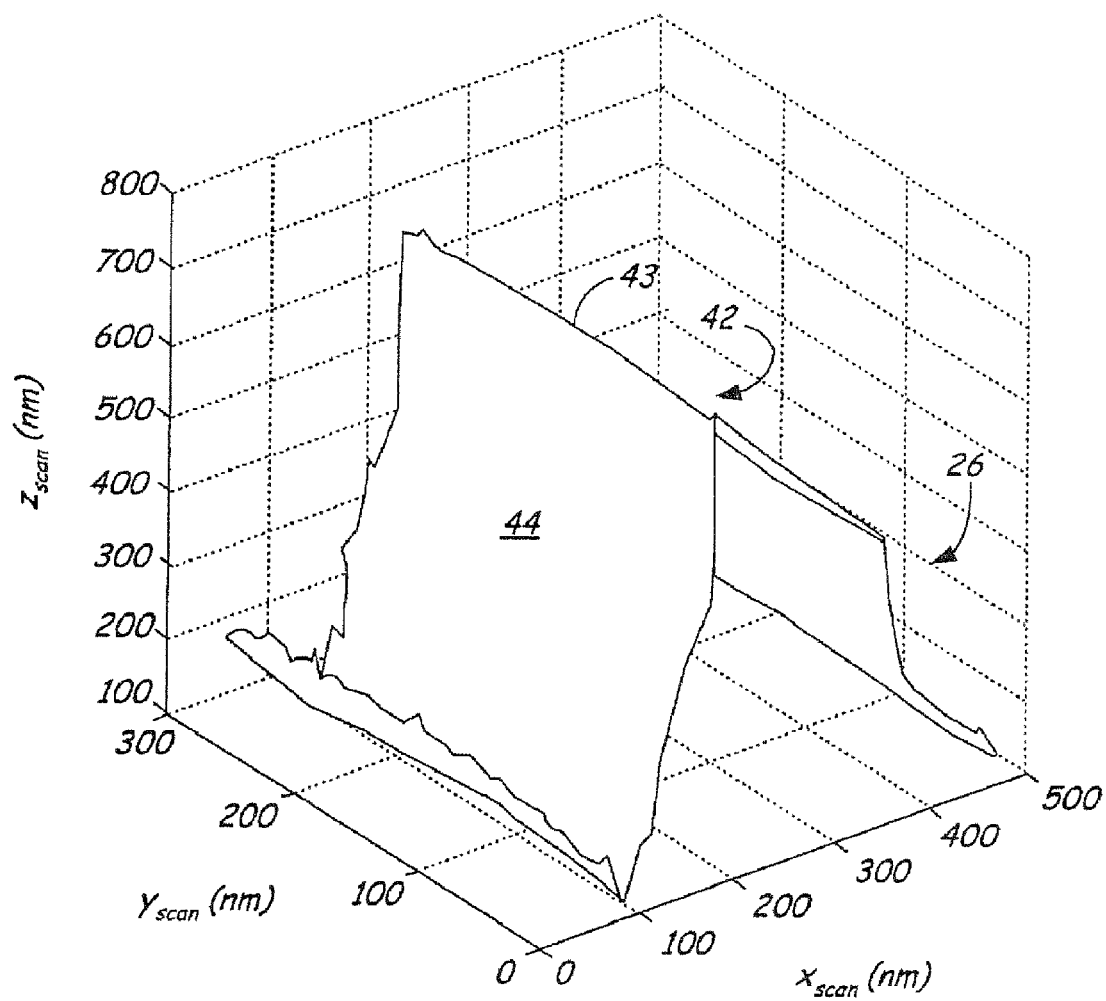
FIG. 4C is a three-dimensional plot of the tilted image profile shown in FIG. 4B.

FIG. 4A is a two-dimensional plot of a raw scanned image profile based on a scan of slider 26 including cavity transition 44 under the above conditions. The contour lines shown in the plot in FIG. 4A represent height changes in slider 26 relative to the z-axis. For context, transition edge 43 and cavity transition 44 are labeled in the image. As is shown, the image representative of slider 26 is skewed relative to the y-axis. In addition, the height change relative to the z-axis should be more pronounced at cavity transition 44, and ABS 42 should include no contour lines because it should be co-planar with the x-axis and the y-axis. However, because few contour lines are shown at cavity transition 44 and several contour lines are shown around ABS 42, the image is also tilted relative to the desired orientation (i.e., with ABS 42 parallel with the xy-plane). The correction of the tilt in the image will be described with regard to FIGS. 4C and 4D.

The skew in the two-dimensional view of slider 26 may be corrected by choosing a feature in the scan and re-orienting the image based on that feature. For example, a derivative map of the image (i.e., a plot of the derivative at every location in the image) shown in FIG. 4A may be generated to determine the locations of transition features (e.g., transition edge 43) in slider 26. The transition feature may then be used as an alignment index for aligning the image within the two-dimensional view. FIG. 4B shows the two-dimensional image of slider 26 including cavity transition 44 after aligning the image relative to the x-axis and y-axis based on transition edge 43.

FIG. 4C is a three-dimensional plot of the tilted image profile of slider 26. As can be seen, while transition edge 43 is aligned with the y-axis, ABS 42 is tilted relative to the xy-plane. To facilitate measurement of cavity transition 44, the image of slider 26 may be rotated relative to the xy-plane. While this rotation may be performed in Cartesian coordinates, the rotation is simplified by first converting each data point in the image of slider 26 to spherical coordinates. Thus, for each data point having coordinates (x, y, z), the corresponding spherical coordinates (R, θ, φ) are given by $$R = \sqrt{x^2 + y^2 + z^2} \quad \text{(Equation 1)}$$

$$\theta = \arctan\left(\frac{y}{x}\right) \quad \text{(Equation 2)}$$

$$\varphi = \arctan\left(\frac{z}{\sqrt{x^2 + y^2}}\right) \quad \text{(Equation 3)}$$

where R is distance from the origin to the data point, θ is the angle from the xz-plane to the point, and φ is the angle from the xy-plane to the point.

The image of slider 26 may be rotated relative to the xy-plane to level ABS 42 by offsetting the angle φ by a correction angle α based on the slope of the tilted ABS 42, $$\alpha = \arctan\left(\frac{dy}{dx}\right) \quad \text{(Equation 4)}$$

where dy/dx is the slope of tilted ABS 42 relative to the xy-plane. To rotate the image of slider 26, each data point may be offset by correction angle α and converted from spherical coordinate back to Cartesian coordinates. Thus, for each data point having coordinates (R, θ, φ−α), the corresponding Cartesian coordinates (x, y, z) are given by $$x = R\cos(\varphi-\alpha)\cos(\theta) \quad \text{(Equation 5),}$$

$$y = R\cos(\varphi-\alpha)\sin(\theta) \quad \text{(Equation 6), and}$$

$$z = R\sin(\varphi-\alpha) \quad \text{(Equation 7).}$$

Figure 4D:
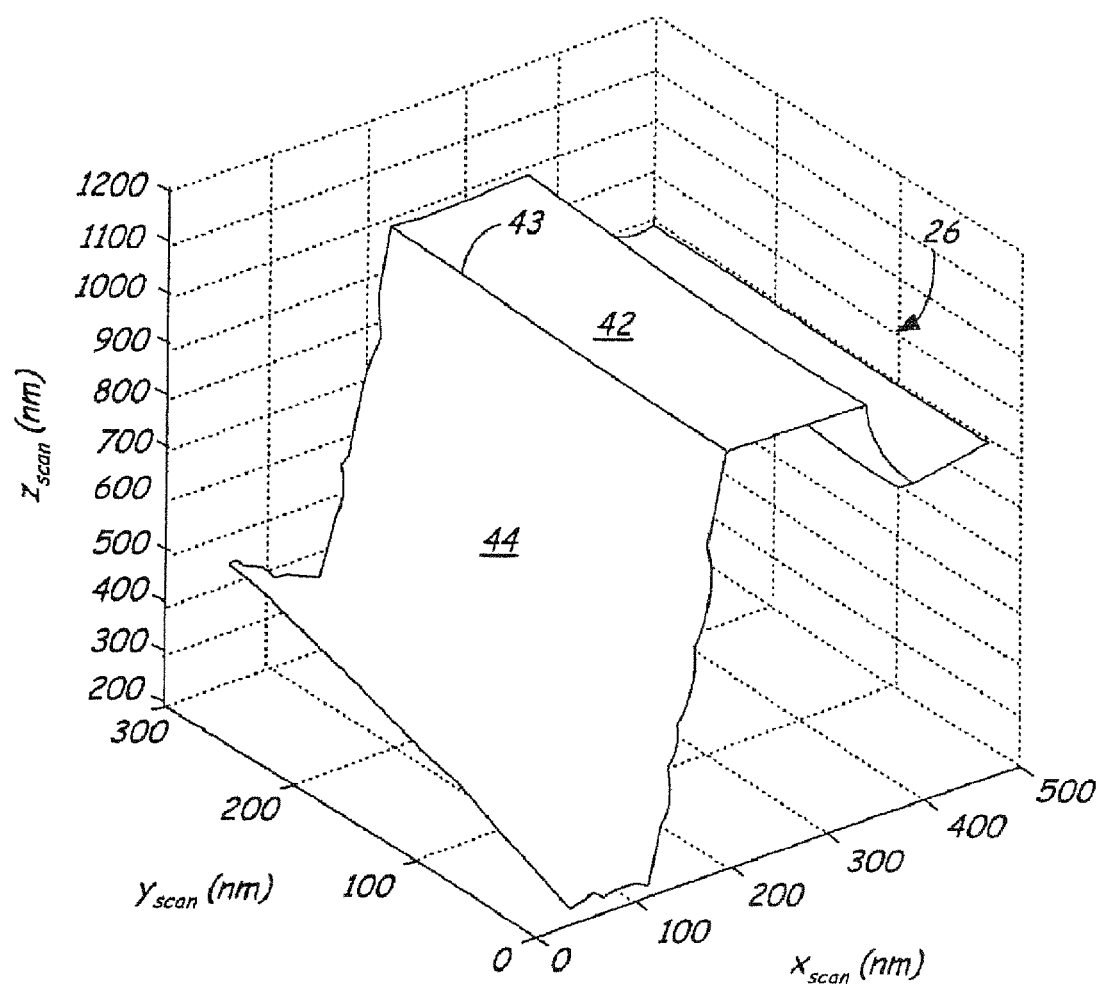
FIG. 4D is a three-dimensional plot of a true image profile of the cavity transition feature.

A plot of the three-dimensional image after rotation, which reflects the true profile of the slider 26 and cavity transition 44, is shown in FIG. 4D.

Artifact Curvature Correction

During an AFM scan, probe tip 16 moves along the scanned surface faster in one direction than in the other direction. For example, as shown in FIG. 3A, probe tip 16 samples the surface along scan lines that run along the y-direction. Thus, for each scan line, a group of data points 56 is sampled in the y-direction, while only a single data point is sampled in the x-direction. In the fast scan direction, probe tip 16 may take a few seconds or less to move from one end of the scan area to the other, while it may take as long as several minutes to move from one end of the scan area to the other in the slow scan direction. Without correction, environmental vibrations, machine drifting, and airflow along probe 11 can cause curvature artifacts in the image in the slow scan direction.

Figure 5B:
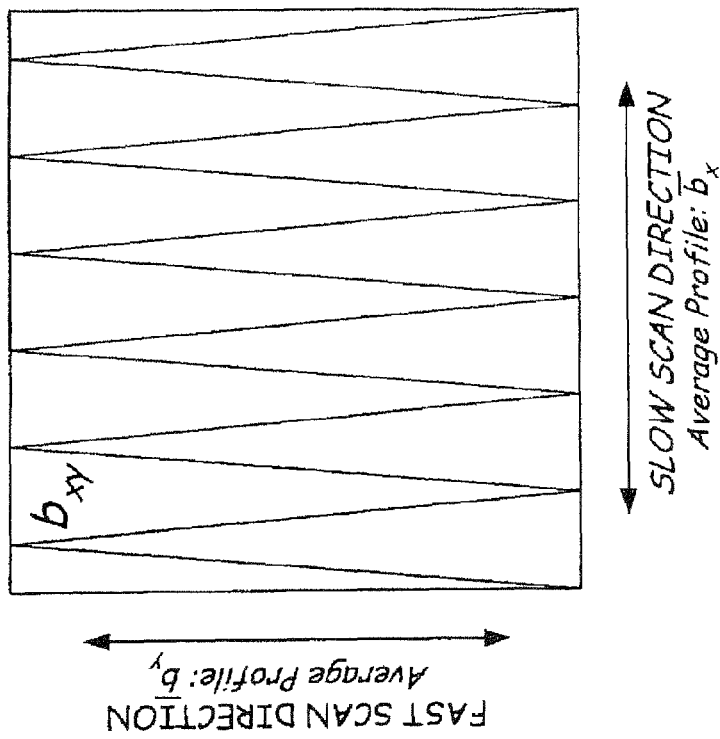
FIG. 5B is a schematic view of a second scan for use in correcting image curvature artifacts in an AFM scan.
Figure 5A:
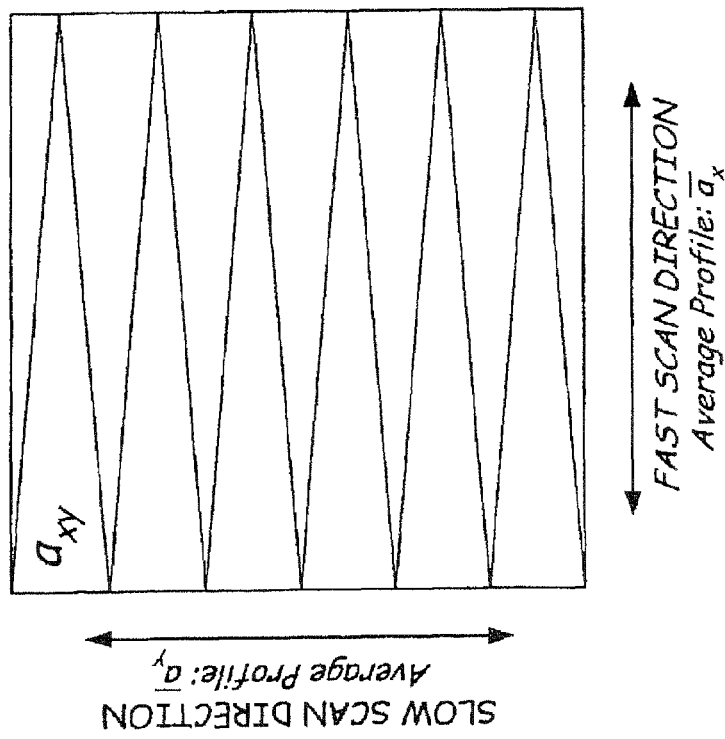
FIG. 5A is a schematic view of a first scan for use in correcting image curvature artifacts in an AFM scan.
Figure 6:
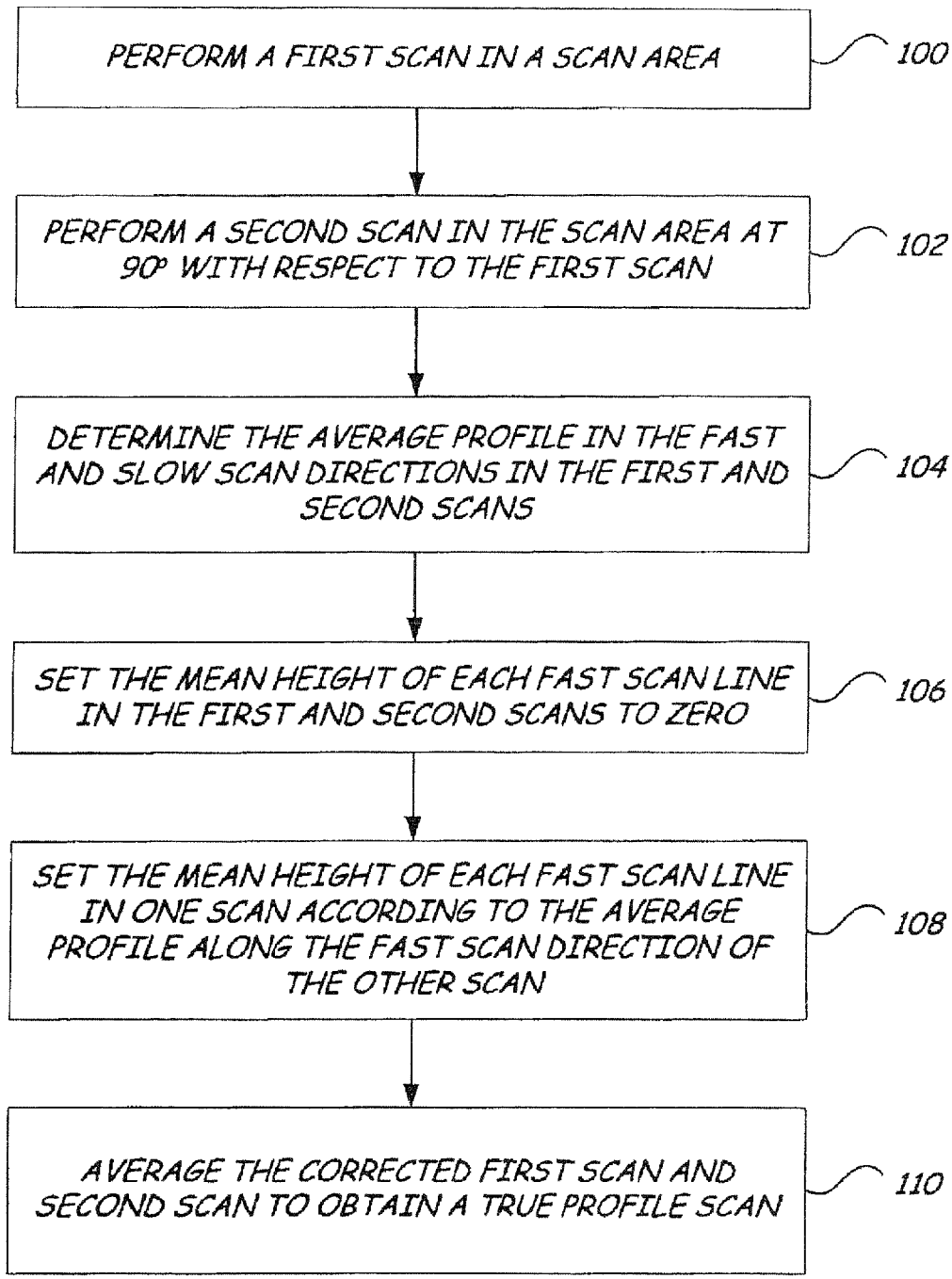
FIG. 6 is a flow diagram showing a process for correcting image curvature artifacts in an AFM scan.

FIGS. 5A and 5B are schematic views of scans that may be used for correcting image curvature artifacts in an AFM scan. FIG. 6 is a flow diagram showing a process for correcting image curvature artifacts in an AFM scan. The scan shown in FIG. 5A is performed within a scan area (step 100), and the scan shown in FIG. 5B is performed in the same scan area at 90°. with respect to the first scan (step 102). For example, the scans shown may be performed within scan area 50 in FIGS. 3A and 3B. The scan patterns shown in FIGS. 5A and 5B are representative of any type of scan pattern having a fast scan direction and a slow scan direction, and are not necessarily representative of an actual scan pattern.

In FIG. 5A, the scan area can be represented by a matrix of data points $a_{xy}$ (x, y=1~n, where n is the periphery dimension of the scan area). For simplicity, the scan area shown is square, but the curvature artifact correction method described is also applicable to scan areas having other dimensions and characteristics. The fast scan direction is the x-direction and the slow scan direction is the y-direction. The fast scan direction has an average profile $\bar{a}_x$ and the slow scan direction has an average profile $\bar{a}_y$ (step 104), where $$\bar{a}_x = \frac{1}{n}\sum_{y=1}^{n} a_{xy}, \quad \text{(Equation 8)}$$

and $$\bar{a}_y = \frac{1}{n}\sum_{x=1}^{n} a_{xy}. \quad \text{(Equation 9)}$$

Similarly, in FIG. 5B, the scan area can be represented by a matrix of data points $b_{xy}$ (x, y=1~n, where n is the periphery dimension of the scan area). In this scan, the fast scan direction is the y-direction and the slow scan direction is the x-direction. The fast scan direction has an average profile $\bar{b}_y$ and the slow scan direction has an average profile $\bar{b}_x$ (step 104), where $$\bar{b}_x = \frac{1}{n}\sum_{y=1}^{n} b_{xy} \quad \text{(Equation 10)}$$

and $$\bar{b}_y = \frac{1}{n}\sum_{x=1}^{n} b_{xy} \quad \text{(Equation 11)}$$

The average profiles along the fast scan direction in the two scans, $\bar{a}_x$ and $\bar{b}_y$, represent the true profile of the structure, while the average profiles along the slow scan direction, $\bar{a}_y$ and $\bar{b}_x$, are a combination of the true profile of the structure and curvature artifacts due to drifting of atomic force microscope 10 and other environmental effects. It is difficult to separate the true shape and drifting artifacts in the slow scan direction. Thus, all information in the slow scan direction may be removed using zero order image flattening by setting the mean height of each scan line in the fast scan direction to zero (i.e., setting the average profile in the slow scan direction to zero) (step 106). The flattened images may thus be represented by $a'_{xy}$ and $b'_{xy}$, where $\bar{a}'_y=0$ and $\bar{b}'_x=0$, and $$a'_{xy}=a_{xy}-\bar{a}_y \quad \text{(Equation 12), and}$$

$$b'_{xy}=b_{xy}-\bar{b}_x \quad \text{(Equation 13).}$$

The correct profile along the slow scan direction for each scan can be obtained by setting the mean height of each fast scan line according to the average profile along the fast scan direction of the other scan (step 108). The corrected images may thus be represented by and, where $$a''_{xy}=a'_{xy}+\bar{b}'_y \quad \text{(Equation 14), and}$$

$$b''_{xy}=b'_{xy}+\bar{a}'_x \quad \text{(Equation 15).}$$

While the two images represented by $a''_{xy}$ and $b''_{xy}$ may be substantially identical, small differences may exist due to variations in the performance of atomic force microscope 10. Thus, to obtain the most accurate representation of the true profile of the structure, $$c_{xy} = \frac{1}{2}(a''_{xy} + b''_{xy}). \quad \text{(Equation 16)}$$

Master Reference Subtraction

At micrometer-level scan lengths, bowing can occur in traditional tube scanner atomic force microscopes, which may also produce curvature in the resulting image. The amplitude and shape of the bowing vary between atomic force microscopes, and may change with aging, temperature, and humidity. Positional offsets between scans of the same surface in the same scan area may also vary the curvature in the corresponding image.

To avoid the contribution of bowing to measurement error, a reference scan may be taken on a flat surface with the same scan settings (e.g., scan size and offsets) of a regular scan. The reference scan is subsequently subtracted from the regular scan to obtain an image without curvature due to the bowing effect. However, any real curvature in the surface of the reference scan will be added to the measurement results. In addition, scan defects, irregular scan lines, and particle contamination in the reference scan may add error to the measurement results.

Figure 7:
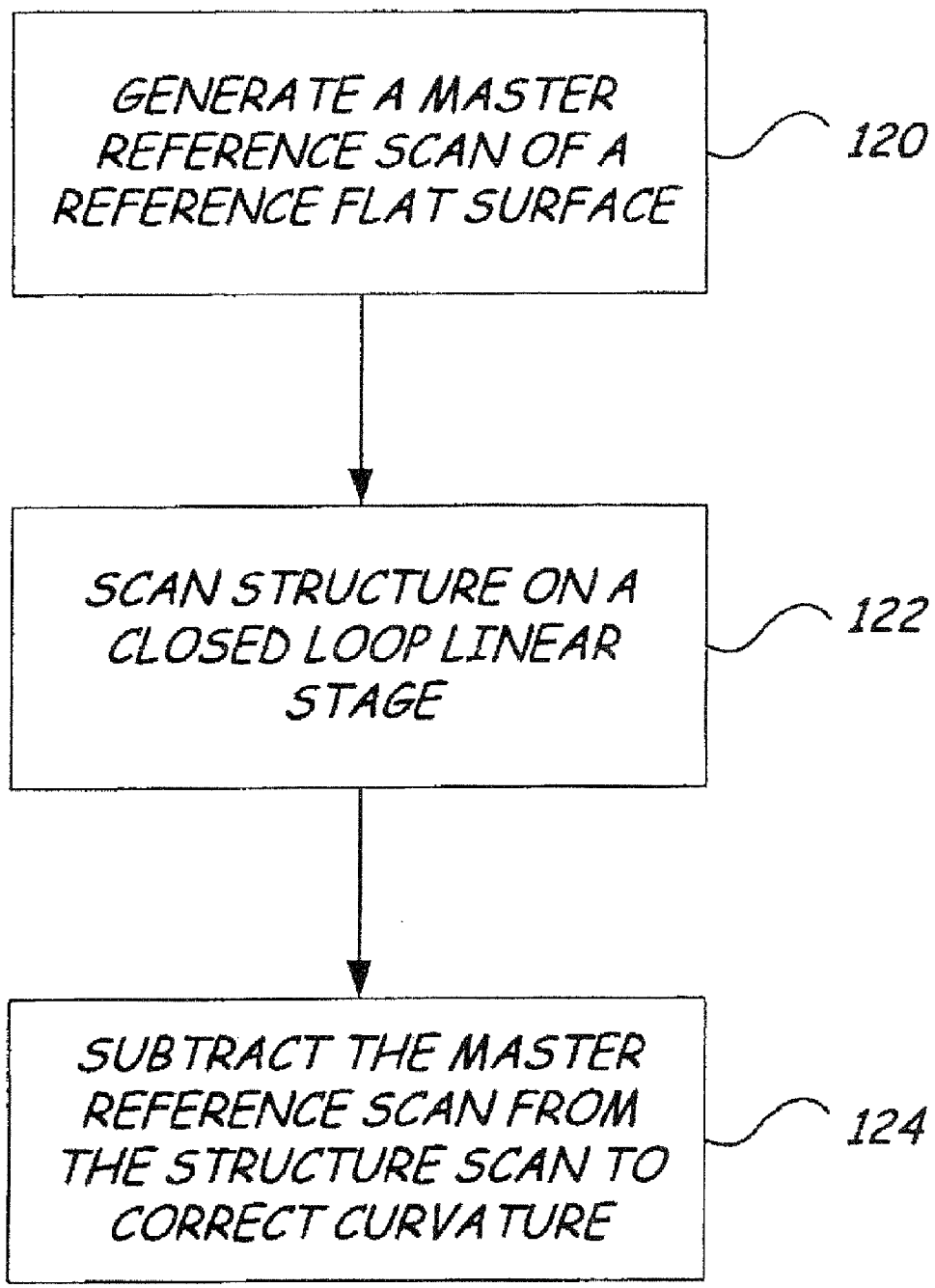
FIG. 7 is a flow diagram showing steps for correcting image curvature artifacts using a master reference scan.

FIG. 7 is a flow diagram showing steps for correcting image curvature artifacts due to the bowing effect using a master reference scan. A master reference scan is generated with atomic force microscope 10 by scanning a flat surface (step 120). For example, the flat air bearing surface of slider 26 in FIG. 1 may be used to generate the master reference scan. The master reference scan is performed under conditions so as to minimize defects in the reference scan. In particular, atomic force microscope 10 is used in environmental conditions that minimize bowing effect and prevent irregular scan lines, and the flat surface is chosen so as to have a minimal amount of particle contamination. By performing a single master reference scan under favorable conditions, the possibility of variations between multiple reference scans due to differing scan conditions is eliminated.

The structure is then placed on a linear stage and moved relative to atomic force microscope 10 with closed loop positioning (step 122). In particular, sensors may be positioned relative to or integrated with the structure to provide signals to processor 22 related to the position of the structure relative to atomic force microscope 10. These signals may then be used by processor 22 to assure that the structure is accurately positioned relative to atomic force microscope 10 in accordance with the programmed scan pattern.

After the structure has been scanned in accordance with the programmed pattern, the master reference scan is subtracted from the structure scan to correct curvature artifacts caused by the bowing effect in probe tip 16 (step 124). In other words, because the bowing effect will cause the same artifacts in the master reference scan and the structure scan, the curvature in the structure scan can be substantially eliminated by subtracting the master reference scan from the structure scan. Because the reference scan does not need to be performed after each structure scan, throughput of the scan process is improved. In addition, the closed loop position feedback on the linear stage assures that the scan pattern is performed in the correct location in the scan area, thus limiting curvature artifacts caused by positional offsets in the scan pattern.

Figure 8:
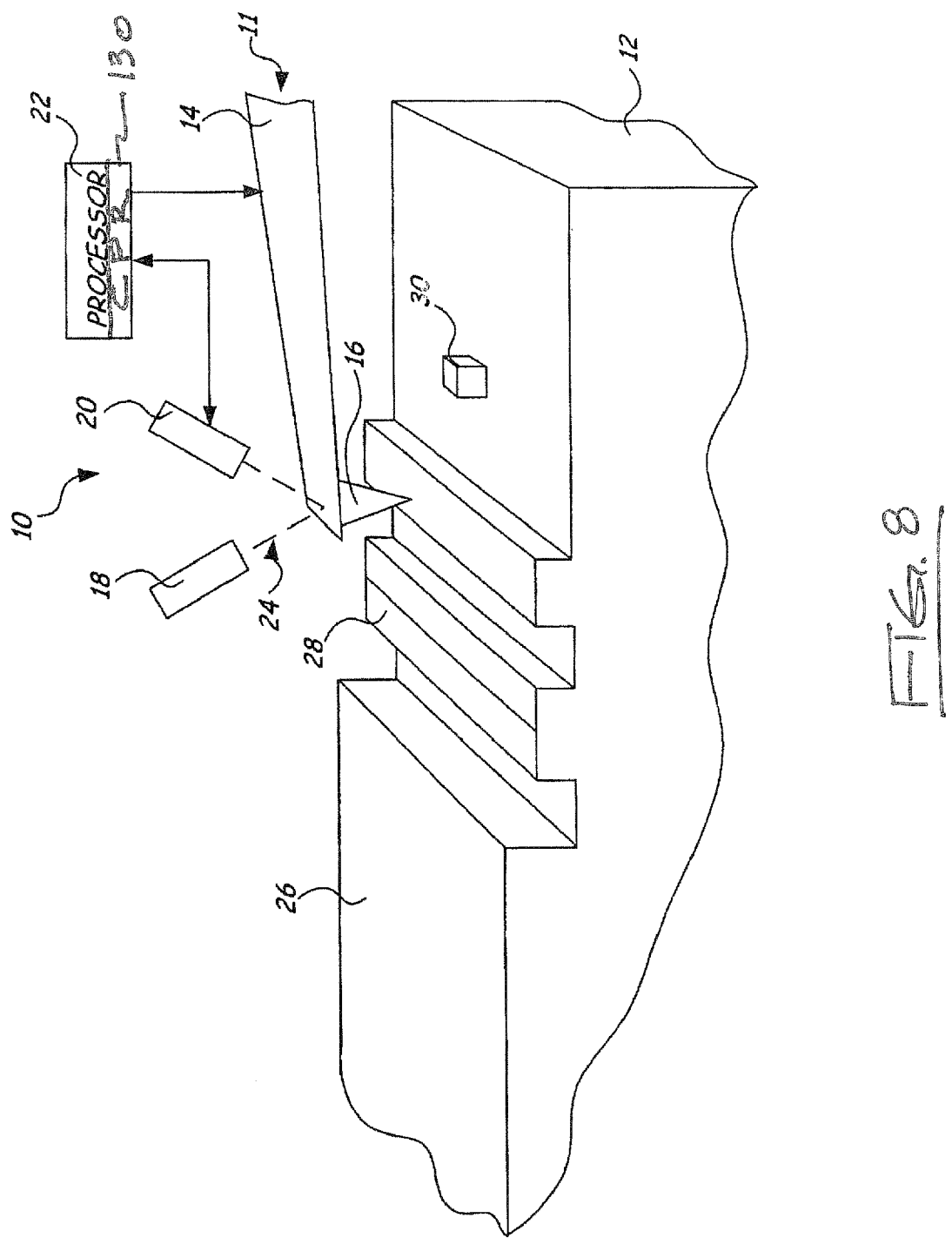
FIG. 8 is a view similar to FIG. 1 but depicting the correlation pattern recognition module that is executed in these illustrative embodiments by the processor.
Figure 9:
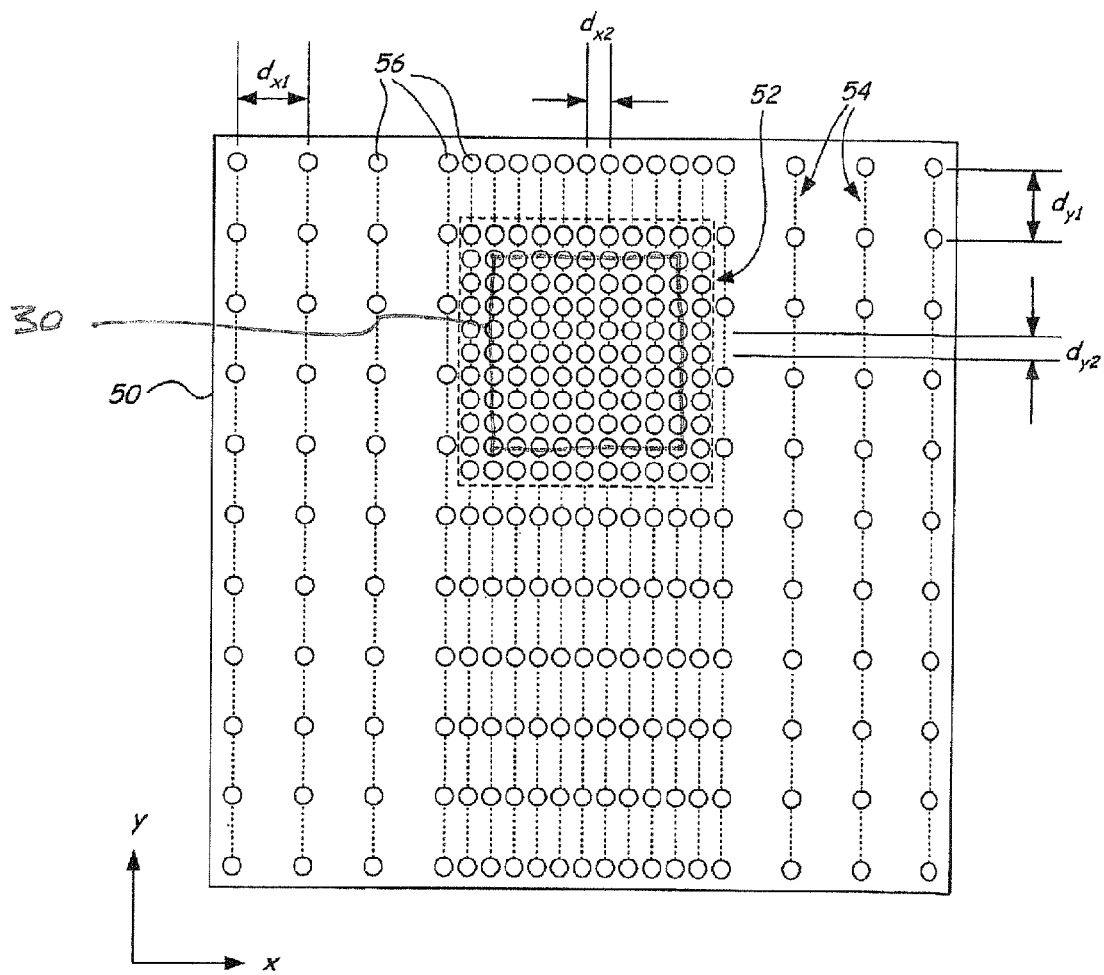
FIG. 9 is a view similar to FIG. 3A but depicting both the reference surface image and the surface of interest image capturing the write pole.

The foregoing description mentioned embodiments in which topographical data is stored for each data point during the scanning process, so that the surface images 50, 52 (FIG. 3A) can be integrated by a pattern recognition algorithm collectively analyzing the stored data. FIG. 8 depicts a view similar to FIG. 1 but for the processor 22 including a correlation pattern recognition ("CPR") module 130. FIG. 9 depicts a view similar to FIG. 3A, but for the overlapping scans of the surfaces 50, 52 both including topography data of the same predetermined target landmark, such as the writer pole 30 in these illustrative embodiments.

As described above, the scanning probe 11 obtains topographical data from the workpiece 12. The processor 22 controls the scanning probe 11 to scan the reference surface 50 (FIG. 3A) of the workpiece 12 to derive a first digital file that characterizes the topography of the reference surface 50. Similarly, the processor controls the scanning probe 11 to scan the surface of interest 52 of the workpiece 12 to derive a second digital file that characterizes the topography of the reference surface 52. In these illustrative embodiments the module CPR 130 stores computer instructions that are executable to process CPR logic that integrates the first and second digital files together to align the reference surface 50 with the surface of interest 52.

Figure 10:
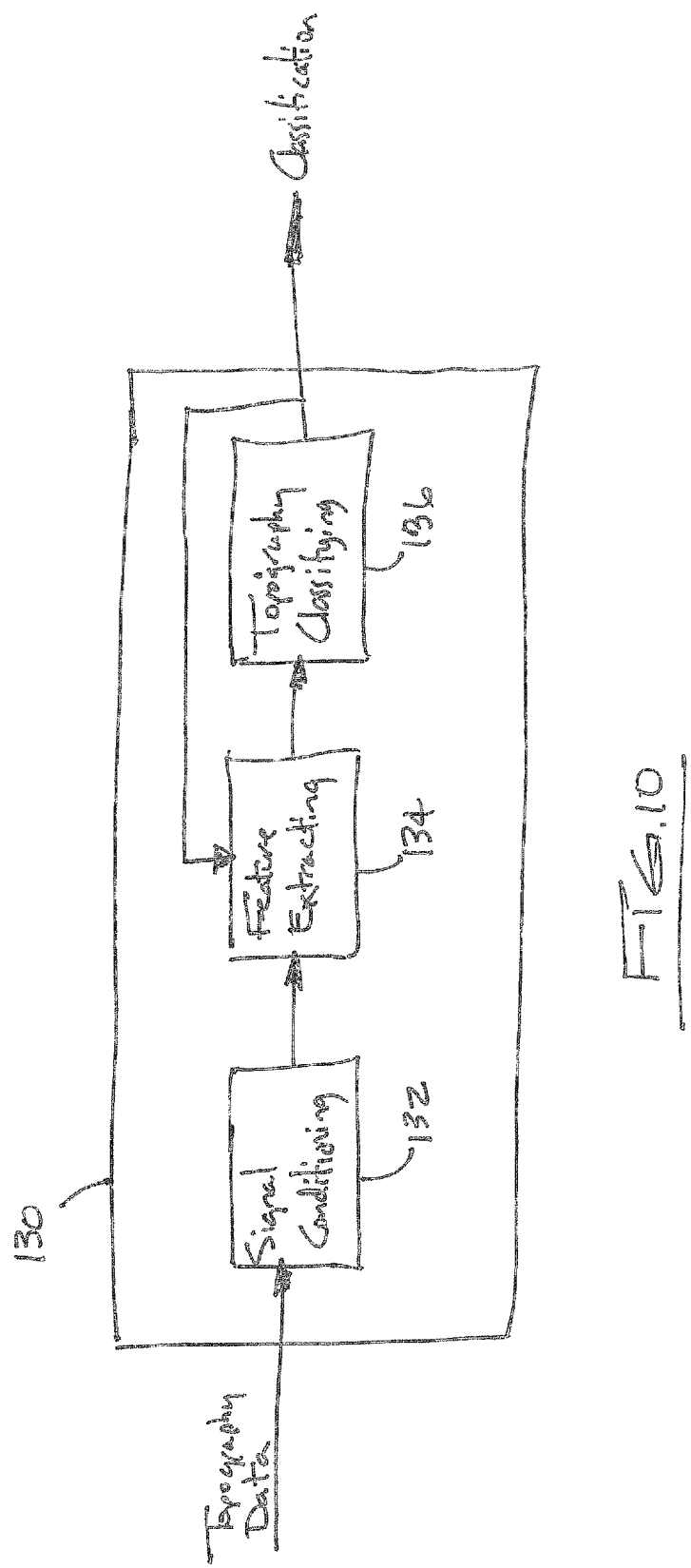
FIG. 10 is a diagrammatic functional depiction of the correlation pattern recognition module.

FIG. 10 is a diagrammatic functional depiction of the CPR logic stored in the module 130 and executed by the processor 22. Generally, the topography data from the detector 20 is processed to assign each observation into one or more of many predefined classes. The classes depend on the application at hand, but generally by a sequence of finer classifications it can be determined whether a statistically significant correlation exists indicating that the second digital file consists of topography forming a pattern that is a subset of the topography defined by the first digital file.

In these illustrative embodiments a signal conditioning module 132 receives the topography data for preprocessing it. The purposes for preprocessing depend on the application at hand, but can include improving the signal to noise ratio, improving the contrast or dynamic range of the image, enhancing the edge information in the image, and other like application specific signal conditioning processes.

The preprocessed data signal is input to a feature extraction module 134. The feature extraction module 134 generally evaluates the data to produce sample descriptors that describe the essence of the image. The sample descriptors involve a number of pixels that is a small fraction of the number of pixels used to generate the image. For example, a pattern recognition approach to identifying the write pole 30 might be by extracting data sets from the digital file forming a V-shape, a characteristic feature of only the corner portion of the entire write pole 30.

The extracted features are input to a topography classifier module 136, which iteratively places the input observations into various classes and shuffles them between classes as a statistically significant correlation is sought. Probability density functions can be used, for example, to determine how similar the topography pattern of the second digital file is to the first digital file. For purposes of this description the correlation of the reference surface image 50 r[m, n] and the surface of interest 52 i[m, n] is done by analytically overlaying the smaller image on the larger image. The images are multiplied pixel-wise and the values of the resulting product array are summed to obtain a correlation value corresponding to that particular arrangement of the small image relative to the large image. That calculation of correlation value is repeated as the smaller image is shifted to all possible centerings of the small image relative to the large image. The peak correlation value can then be compared to a predetermined threshold value to determine whether a statistical correlation of sufficient relevance exists to deem the existence of a pattern match. The correlation value c[m, n] in some illustrative embodiments can be derived in terms of:

$$c[m,n]=\Sigma_k\Sigma_l i[k,l]r[k+m,l+n]$$ (Equation 17)

As described, the relatively higher resolution of the surface of interest 52 image, such as is obtained by variable scan speed and/or variable sampling rate, is preferably matched by increasing the resolution of the reference surface 50 image before integrating the respective digital files via the CPR logic. Also as described, for optimal accuracy the digital files are flattened to compensate for any tilt and drift of the workpiece before integrating the digital files via the CPR logic.

The contemplated embodiments include a corresponding method of topographically characterizing the workpiece. The method includes scanning the reference surface 50 of the workpiece 12 with the scanning probe 11 to derive the first digital file characterizing topography of the reference surface 50. The method similarly includes scanning the surface of interest 52 of the workpiece 12, the surface of interest 52 at least in part defined by a subportion of the reference surface 50, with the scanning probe 11 to derive the second digital file characterizing topography of the surface of interest 52. The method further includes executing computer instructions stored in memory that integrate the first and second digital files together in relation to the CPR logic to align the reference surface 50 with the surface of interest 52.

Generally, the embodiments of the present invention contemplate a topography metrology apparatus including the processor 22 controlling the scanning probe 11 to obtain topographical data from the workpiece 12, and means for integrating two or more sets of the topographical data together in relation to a statistical determination that one of the sets of topographical data is alignable for defining a pattern matching a pattern defined by another one of the sets of topographical data. For purposes of this description and meaning of the appended claims the term "means for integrating" encompasses the disclosed structure and equivalents thereof that are capable of statistically correlating patterns of topography data to align and thereby integrate two or more sets of the topographical data.

In summary, a topographic profile of a structure is generated using atomic force microscopy. The structure is scanned such that an area of interest of the structure is scanned at a higher resolution than portions of the structure outside of the area of interest. An image of the structure is then generated based on the scan. To correct skew and tilt of the image, a first feature of the image is aligned with a first axis of a coordinate system. The image is then rotated to align a second feature of the image with a second axis of the coordinate system. The structure scan may be performed in a single scan or by integrating multiple scans of the structure at different levels of resolution. The resulting image of the structure has a higher resolution in the area of interest than in the remainder of scan area. This scan process preserves the contextual details in the areas around the area of interest.

Although the present invention has been described with reference to preferred embodiments, workers skilled in the art will recognize that changes may be made in form and detail without departing from the spirit and scope of the invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. A method of topographically characterizing a workpiece, comprising:
   scanning a reference surface of the workpiece with a scanning probe to derive a first digital file characterizing topography of the reference surface;
   scanning a surface of interest of the workpiece, the surface of interest at least in part defined by a subportion of the reference surface, with the scanning probe to derive a second digital file characterizing topography of the surface of interest; and
   executing computer instructions stored in memory that integrate the first and second digital files together in relation to correlation pattern recognition logic to align the reference surface with the surface of interest.

2. The method of claim 1 wherein the scanning a reference surface step is performed at a first resolution and the scanning a surface of interest step is performed at a second resolution different than the first resolution.

3. The method of claim 2 wherein the second resolution is greater than the first resolution.

4. The method of claim 1 wherein the executing step is characterized by the correlation pattern recognition logic statistically integrating a correlation value between the first and second digital files and comparing the correlation integrated value to a predetermined threshold value.

5. The method of claim 1 wherein each of the scanning steps is characterized by scanning a predetermined target landmark on the workpiece, and wherein the executing step is characterized by aligning together digital representations of the predetermined target landmark in each of the first and second digital files.

6. The method of claim 1 further comprising flattening at least one of the digital files derived from the scanning steps to correct for at least one of tilt and drift of the workpiece before the executing step.

7. The method of claim 6 wherein the flattening step is characterized by integrating two or more scans together during at least one of the scanning a reference surface step and the scanning a surface of interest step.

8. The method of claim 7 wherein the flattening step is characterized by a first scan of the two or more scans including a first fast scan direction and a first slow scan direction, and a second scan of the two or more scans including a second fast scan substantially orthogonal to the first fast scan and a second slow scan substantially orthogonal to the first slow scan.

9. The method of claim 6 wherein the flattening step is characterized by scanning a known flat surface to derive a third digital file and subtracting the third digital file from at least one of the first and second digital files.

10. The method of claim 1 wherein the scanning a reference surface step is characterized by a first scan speed and the scanning a surface of interest step is characterized by a second scan speed that is slower than the first scan speed.

11. The method of claim 1 wherein the scanning a reference surface step is characterized by a first sampling rate and the scanning a surface of interest step is characterized by a second sampling rate that is greater than the first sampling rate.

12. An apparatus for topographically characterizing a workpiece, comprising:
a scanning probe that obtains topographical data from the workpiece;
a processor controlling the scanning probe to scan a reference surface of the workpiece to derive a first digital file and to scan a surface of interest that includes at least a portion of the reference surface to derive a second digital file; and
correlation pattern recognition logic that integrates the first and second digital files together to align the reference surface with the surface of interest.

13. The apparatus of claim 12 wherein the processor derives the first digital file at a first resolution and derives the second digital file at a second resolution that is greater than the first resolution.

14. The apparatus of claim 13 wherein the processor varies the resolution by at least one of a variable scan speed and a variable sampling rate.

15. The apparatus of claim 13 wherein the correlation pattern recognition logic changes one of the first and second resolutions to match the other of the first and second resolutions before integrating the first and second digital files together.

16. The apparatus of claim 12 wherein the correlation pattern recognition logic statistically integrates a correlation value between the first and second digital files and compares the integrated value to a predetermined threshold value.

17. The apparatus of claim 12 wherein the workpiece defines a predefined target landmark and the correlation pattern recognition logic aligns together digital representations of the target landmark in each of the first and second digital files.

18. The apparatus of claim 12 wherein the correlation pattern recognition logic flattens at least one of the digital files derived from the scanning probe to correct for at least one of tilt and drift of the workpiece before integrating the digital files together.

19. The apparatus of claim 18 wherein the correlation pattern recognition logic flattens the at least one of the digital files by integrating two or more scans together.

20. A topography metrology apparatus, comprising;
a processor controlling a scanning probe to obtain topographical data from a workpiece; and
means for integrating two or more sets of the topographical data together in relation to a statistical determination that one of the sets of topographical data defines a pattern matching a pattern defined by another one of the sets of topographical data.

* * * * *